(12) United States Patent
Brantley

(10) Patent No.: US 11,334,656 B2
(45) Date of Patent: May 17, 2022

(54) 3D VIRTUAL INTERACTIVE DIGITAL USER AUTHENTICATION SECURITY

(71) Applicant: Jacob Lynn Brantley, Boulder, CO (US)

(72) Inventor: Jacob Lynn Brantley, Boulder, CO (US)

(73) Assignee: MINDPASS, INC., Kingston, TN (US)

( * ) Notice: Subject to any disclaimer, the term of this patent is extended or adjusted under 35 U.S.C. 154(b) by 68 days.

(21) Appl. No.: 15/983,083

(22) Filed: May 17, 2018

(65) Prior Publication Data
US 2019/0354669 A1 Nov. 21, 2019

(51) Int. Cl.
G06F 21/36 (2013.01)
G06T 19/00 (2011.01)
G06F 21/45 (2013.01)

(52) U.S. Cl.
CPC .............. *G06F 21/36* (2013.01); *G06F 21/45* (2013.01); *G06T 19/003* (2013.01)

(58) Field of Classification Search
None
See application file for complete search history.

(56) References Cited

U.S. PATENT DOCUMENTS

| | | | | |
|---|---|---|---|---|
| 2011/0320816 A1* | 12/2011 | Yao | .............. | G06F 21/316 713/171 |
| 2013/0314208 A1* | 11/2013 | Risheq | .............. | H04L 63/0861 340/5.53 |
| 2014/0317028 A1* | 10/2014 | Turgeman | .............. | G06N 5/04 706/11 |
| 2015/0143509 A1* | 5/2015 | Selander | .............. | G06F 21/36 726/18 |
| 2016/0055330 A1* | 2/2016 | Morishita | .............. | G06F 21/36 726/19 |
| 2016/0188861 A1* | 6/2016 | Todeschini | .............. | G06F 21/32 726/7 |
| 2016/0294837 A1* | 10/2016 | Turgeman | .............. | G06F 21/316 |
| 2017/0195356 A1* | 7/2017 | Turgeman | .............. | H04L 63/1425 |
| 2018/0157823 A1* | 6/2018 | Maresh | .............. | H04L 63/102 |
| 2019/0236259 A1* | 8/2019 | Remillet | .............. | G06F 3/04815 |

\* cited by examiner

*Primary Examiner* — Kaveh Abrishamkar
(74) *Attorney, Agent, or Firm* — Berg Hill Greenleak & Ruscitti LLP

(57) ABSTRACT

The provided invention is a unique method and system for generating and using a digital memorized secret, password or other form of digital user authentication by navigating a realistic virtual 3D environment with a keyboard, controller, mouse, virtual reality device or other form of virtual navigation device and selecting an ordered sequence of objects within the virtual 3D environment. The selected sequence of objects have associated character strings or other associated data which are cumulatively stored and used as the users method of user authentication in place of a traditional password, memorized secret or other form of digital user authentication. Encryption and decryption of any data within this system may be performed on both the client and server sides. Hashing and salting of the memorized secret, password or other form of digital user authentication may be performed on both the client and server sides.

20 Claims, 2 Drawing Sheets

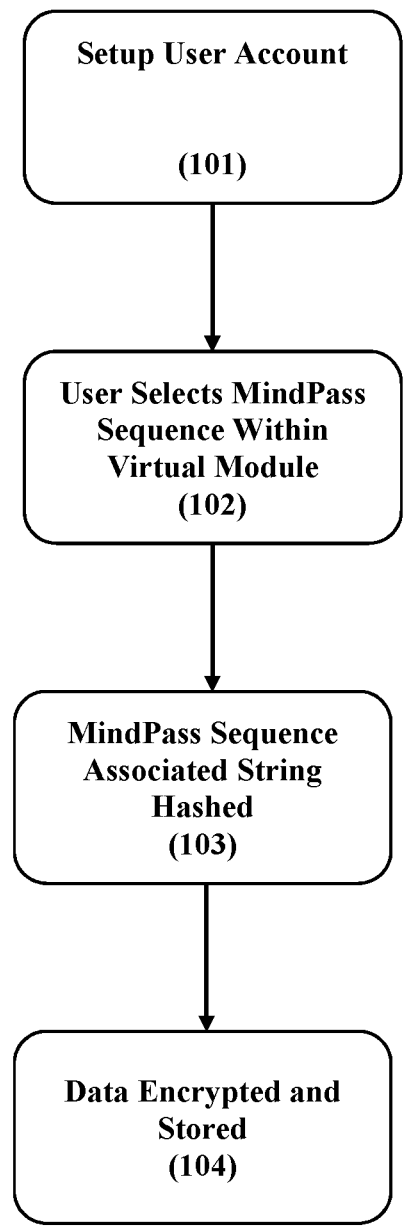
FIG. 1 (100)

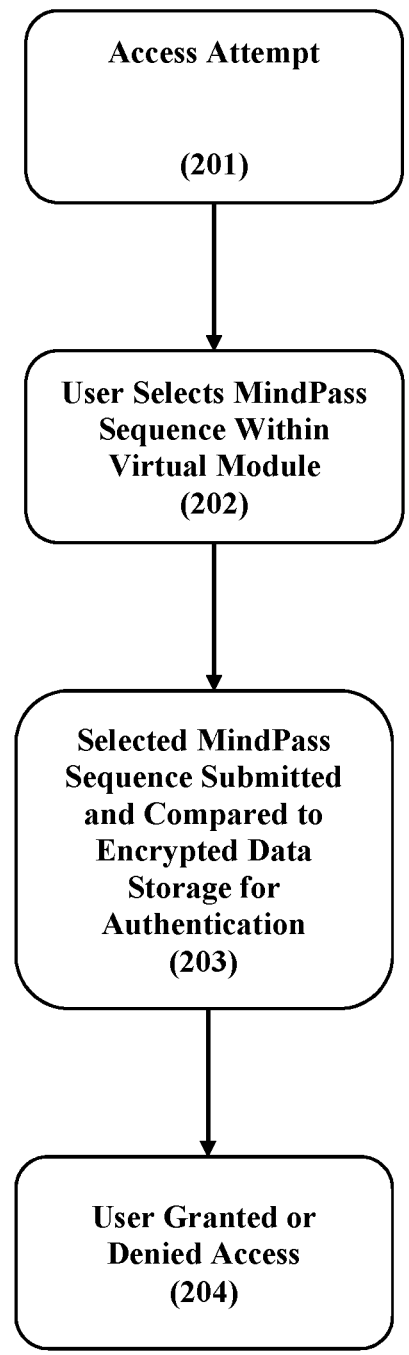
FIG. 2 (200)

3D VIRTUAL INTERACTIVE DIGITAL USER AUTHENTICATION SECURITY

REFERENCES CITED

U.S. Patent Documents

U.S. Pat. No. 9,589,125 March/2017 Tao
U.S. Pat. No. 5,559,961 September/1996 Blonder
U.S. Pat. No. 5,608,387 February/1997 Davies
U.S. Pat. No. 6,686,931 February/2004 Bodnar
U.S. Pat. No. 8,458,485 June/2013 Bandyopadhyay, et al.

OTHER REFERENCES

1. NIST Special Publication 800-63B, "Digital Identity Guidelines", June 2017
2. NIST Federal Information Processing Standards Publication 140-2, "Security Requirements for Cryptographic Modules"
3. NIST Draft Special Publication 800-53 Rev. 5, "Security and Privacy Controls for Information Systems and Organizations", August 2017
4. J. Bonneau, C. Herley, P. C. van Oorschot, and F. Stajano, "The quest to replace passwords: A framework for comparative evaluation of web authentication schemes," University of Cambridge Computer Laboratory, Tech Report 817, 2012, www.cl.cam.ac.uk/techreports/UCAM-CL-TR-817.html.
5. "Why your passwords aren't strong enough—And what to do about it.", https://fieldguide.gizmodo.com/why-your-passwords-arent-strong-enough-and-what-to-do-a-1823684095
6. "Unmasked: What 10 million passwords reveal about the people who choose them.", https://wpengine.com/unmasked/
7. "Authentication Story Index", http://passwordresearch.com/stories/storyindex.html
8. "Biometrics are coming, along with serious security concerns.", https://www.wired.com/2016/03/biometrics-coming-along-serious-security-concerns/
9. Announcing Approval of Federal Information Processing Standard (FIPS) 197, Advanced Encryption Standard (AES), National Institute of Standards and Technology (NIST), Commerce., Dec. 6, 2001

Glossary of Terms

1. Cryptographic module: The set of hardware, software, and/or firmware that implements approved security functions (including cryptographic algorithms and key generation) and is contained within the cryptographic boundary.
2. Cryptographic boundary: An explicitly defined continuous perimeter that establishes the physical bounds of a cryptographic module and contains all the hardware, software, and/or firmware components of a cryptographic module.
3. Memorized secret: A type of authenticator comprised of a character string intended to be memorized or memorable by the subscriber, permitting the subscriber to demonstrate something they know as part of an authentication process.
4. Dictionary attack: A guessing attack which uses a pre-compiled list of options.
5. Rainbow table: A precomputed table for reversing cryptographic hash functions, usually for cracking password hashes.
6. Digital (user) authentication: The unique representation of a subject engaged in online transactions of any kind.

STATEMENT

As required per 37 CFR 1.52(b), this substitute specification includes no new matter.

TECHNICAL FIELD

The presently disclosed embodiments are related in general to user authentication systems and specifically to methods and systems that assist users in generating memorized secrets, passwords or other forms of digital user authentication within a 3D virtual interactive program for a cloud based password manager, local device password manager, website, application, mobile device, computer, gaming console or other device.

BACKGROUND

Digital (user) authentication is the unique representation of a subject engaged in online transactions of any kind. Security experts and digital authentication regulators have long recognized the lack of security provided by modern digital authentication systems, namely passwords. Many attempts have been made at improving security by regulating, modifying and/or replacing modern user authentication schemes to little avail. Cambridge produced a comparative evaluation of web authentication schemes which quantifies the attributes integral to a user authentication system [4]. This evaluation has become a standard in user authentication courses at major universities such as Cambridge and The Massachusetts Institute of Technology (MIT). The following tables reproduced and summarized from the Cambridge evaluation illustrate the benefits and shortcomings of the many proposed alternative user authentication schemes. Password based user authentication systems encompass almost the entire market, and as such, the study compares all proposed alternative schemes to password schemes as the standard.

TABLE 1

Comparative Evaluation of Usability of Alternative Password Schemes

| Category | Scheme | Usability | | | | |
| --- | --- | --- | --- | --- | --- | --- |
| | | Memorywise effortless | Scalable for users | Nothing to carry | Physically effortless | Easy to learn |
| Incumbent | Web Passwords | NC | NC | Y | NC | Y |

TABLE 1-continued

Comparative Evaluation of Usability of Alternative Password Schemes

| Category | Scheme | | | | | |
|---|---|---|---|---|---|---|
| Password managers | Firefox | O/B | Y/B | O/W | O/B | Y |
| | LastPass | O/B | Y/B | O/W | O/B | Y |
| Proxy | URRSA | Y/B | NC | NC/W | NC | Y |
| | Imposter | O/B | Y/B | Y | NC | Y |
| Federated | OpenID | O/B | Y/B | Y | O/B | O/W |
| | Microsoft Passport | O/B | Y/B | Y | O/B | Y |
| | Facebook Connect | O/B | Y/B | Y | O/B | Y |
| | Browser ID | O/B | Y/B | Y | O/B | Y |
| | OTP over email | O/B | Y/B | Y | NC | Y |
| Graphical | PCCP | NC | NC | Y | NC | Y |
| | PassGo | NC | NC | Y | NC | Y |
| Cognitive | GrIDSure | NC | NC | Y | NC | Y |
| | Weinshall | NC | NC | Y | NC | NC/W |
| | Hopper Blum | NC | NC | Y | NC | NC/W |
| | Word Association | NC | NC | Y | NC | Y |
| Paper tokens | OTPW | NC | NC | NC/W | NC | Y |
| | S/KEY | Y | NC | NC/W | NC | Y |
| | PIN + TAN | NC | NC | NC/W | NC | Y |
| Visual crypto | PassWindow | Y/B | NC | NC/W | NC | NC/W |
| Hardware tokens | RSA SecurID | NC | NC | NC/W | NC | Y |
| | YubiKey | NC | NC | NC/W | NC | Y |
| | Iron Key | O/B | Y/B | NC/W | O/B | O/W |
| | CAP reader | NC | NC | NC/W | NC | Y |
| | Pico | Y/B | Y/B | NC/W | Y/B | NC/W |
| Phone based | Phoolproof | NC | NC | O/W | NC | Y |
| | Cronto | NC | NC | O/W | NC | Y |
| | MP-Auth | NC | NC | O/W | NC | Y |
| | OTP over SMS | Y/B | Y/B | O/W | NC | Y |
| | Google 2-Step | NC | NC | O/W | NC | Y |
| Biometric | Fingerprint | Y/B | Y/B | Y | O/B | Y |
| | Iris | Y/B | Y/B | Y | O/B | Y |
| | Voice | Y/B | Y/B | Y | O/B | Y |
| Recovery | Personal knowledge | O/B | NC | Y | NC | Y |
| | Preference-based | O/B | NC | Y | NC | Y |
| | Social re-auth | NC | NC | Y | NC | Y |

| | | Usability | | |
|---|---|---|---|---|
| Category | Scheme | Efficient to use | Infrequent errors | Easy recovery from loss |
| Incumbent | Web Passwords | Y | O | Y |
| Password managers | Firefox | Y | Y/B | NC/W |
| | LastPass | Y | Y/B | O/W |
| Proxy | URRSA | NC/W | O | O/W |
| | Imposter | NC/W | NC/W | Y |
| Federated | OpenID | Y | Y/B | Y |
| | Microsoft Passport | Y | Y/B | Y |
| | Facebook Connect | Y | Y/B | Y |
| | Browser ID | Y | Y/B | Y |
| | OTP over email | NC/W | Y/B | Y |
| Graphical | PCCP | O/W | O | Y |
| | PassGo | O/W | O | Y |
| Cognitive | GrIDSure | O/W | O | Y |
| | Weinshall | NC/W | NC/W | NC/W |
| | Hopper Blum | NC/W | NC/W | NC/W |
| | Word Association | Y | O | O/W |

TABLE 1-continued

Comparative Evaluation of Usability of Alternative Password Schemes

| | | | | |
|---|---|---|---|---|
| Paper tokens | OTPW | NC/W | NC/W | Y |
| | S/KEY | NC/W | O | Y |
| | PIN + TAN | NC/W | O | O/W |
| Visual crypto | PassWindow | NC/W | NC/W | NC/W |
| Hardware tokens | RSA SecurID | O/W | O | NC/W |
| | YubiKey | O/W | O | NC/W |
| | IronKey | O/W | O | NC/W |
| | CAP reader | O/W | O | NC/W |
| | Pico | O/W | O | NC/W |
| Phone based | Phoolproof | O/W | O | NC/W |
| | Cronto | O/W | O | NC/W |
| | MP-Auth | O/W | NC/W | O/W |
| | OTP over SMS | NC/W | O | O/W |
| | Google 2-Step | O/W | O | O/W |
| Biometric | Fingerprint | O/W | NC/W | NC/W |
| | Iris | O/W | NC/W | NC/W |
| | Voice | O/W | NC/W | NC/W |
| Recovery | Personal knowledge | Y | O | Y |
| | Preference-based | O/W | Y/B | O/W |
| | Social re-auth | NC/W | Y/B | NC/W |

Y = Offers the benefit
N = Does not offer the benefit
O = Almost offers the benefit
B = Better than passwords
W = Worse than passwords
NC = No change

TABLE 2

Comparative Evaluation of Deployability of Alternative Password Schemes

| | | Deployability | | | | |
|---|---|---|---|---|---|---|
| Category | Scheme | Accessible | Negligible cost per user | Server compatible | Browser compatible | Mature |
| Incumbent | Web Passwords | Y | Y | Y | Y | Y |
| Password managers | Firefox | Y | Y | Y | NC/W | Y |
| | LastPass | Y | NC/W | Y | NC/W | Y |
| Proxy | URRSA | NC/W | Y | O/W | Y | NC/W |
| | Imposter | Y | Y | Y | Y | NC/W |
| Federated | OpenID | Y | Y | NC/W | Y | Y |
| | Microsoft Passport | Y | NC/W | NC/W | Y | Y |
| | Facebook Connect | Y | Y | NC/W | Y | Y |
| | Browser ID | Y | Y | NC/W | O/W | O/W |
| | OTP over email | Y | Y | NC/W | Y | NC/W |
| Graphical | PCCP | NC/W | Y | NC/W | Y | NC/W |
| | PassGo | NC/W | Y | NC/W | Y | O/W |
| Cognitive | GrIDSure | NC/W | Y | NC/W | Y | NC/W |
| | Weinshall | NC/W | Y | NC/W | Y | NC/W |
| | Hopper Blum | Y | Y | NC/W | Y | NC/W |
| | Word Association | Y | Y | NC/W | Y | NC/W |
| Paper tokens | OTPW | NC/W | Y | NC/W | Y | Y |
| | S/KEY | NC/W | Y | NC/W | Y | Y |
| | PIN + TAN | NC/W | O/W | NC/W | Y | Y |
| Visual crypto | PassWindow | NC/W | O/W | NC/W | Y | Y |

TABLE 2-continued

Comparative Evaluation of Deployability of Alternative Password Schemes

| Category | Scheme | | | | | |
|---|---|---|---|---|---|---|
| Hardware tokens | RSA SecurID | NC/W | NC/W | Y | Y | Y |
| | YubiKey | Y | NC/W | Y | Y | Y |
| | IronKey | Y | Y | Y | Y | Y |
| | CAP reader | NC/W | NC/W | Y | Y | Y |
| | Pico | NC/W | NC/W | NC/W | NC/W | NC/W |
| Phone based | Phoolproof | O/W | O/W | O/W | NC/W | NC/W |
| | Cronto | NC/W | O/W | NC/W | Y | Y |
| | MP-Auth | O/W | O/W | NC/W | NC/W | NC/W |
| | OTP over SMS | O/W | NC/W | NC/W | Y | Y |
| | Google 2-Step | O/W | NC/W | NC/W | Y | Y |
| Biometric | Fingerprint | O/W | NC/W | NC/W | NC/W | O/W |
| | Iris | O/W | NC/W | NC/W | NC/W | O/W |
| | Voice | O/W | O/W | NC/W | O/W | O/W |
| Recovery | Personal knowledge | Y | Y | NC/W | Y | Y |
| | Preference-based | Y | Y | NC/W | Y | NC/W |
| | Social re-auth | Y | Y | NC/W | Y | O/W |

| | | Deployability | | | | |
|---|---|---|---|---|---|---|
| Category | Scheme | Non proprietary | Negligible cost per user | Server compatible | Browser compatible | Mature |
| Incumbent | Web Passwords | Y | | | | |
| Password managers | Firefox | Y | | | | |
| | LastPass | NC/W | | | | |
| Proxy | URRSA | NC/W | | | | |
| | Imposter | Y | | | | |
| Federated | OpenID | Y | | | | |
| | Microsoft Passport | NC/W | | | | |
| | Facebook Connect | NC/W | | | | |
| | Browser ID | Y | | | | |
| | OTP over email | Y | | | | |
| Graphical | PCCP | Y | | | | |
| | PassGo | Y | | | | |
| Cognitive | GrIDSure | NC/W | | | | |
| | Weinshall | Y | | | | |
| | Hopper Blum | Y | | | | |
| | Word Association | Y | | | | |
| Paper tokens | OTPW | Y | | | | |
| | S/KEY | Y | | | | |
| | PIN + TAN | Y | | | | |
| Visual crypto | PassWindow | NC/W | | | | |
| Hardware tokens | RSA SecurID | NC/W | | | | |
| | YubiKey | NC/W | | | | |
| | IronKey | NC/W | | | | |
| | CAP reader | NC/W | | | | |
| | Pico | Y | | | | |
| Phone based | Phoolproof | Y | | | | |
| | Cronto | NC/W | | | | |
| | MP-Auth | Y | | | | |
| | OTP over SMS | Y | | | | |
| | Google 2-Step | NC/W | | | | |
| Biometric | Fingerprint | NC/W | | | | |
| | Iris | NC/W | | | | |
| | Voice | NC/W | | | | |

TABLE 2-continued

Comparative Evaluation of Deployability of Alternative Password Schemes

| Recovery | Personal knowledge | Y |
| | Preference-based | NC/W |
| | Social re-auth | NC/W |

Y = Offers the benefit
N = Does not offer the benefit
O = Almost offers the benefit
B = Better than passwords
W = Worse than passwords
NC = No change

TABLE 3

Comparative Evaluation of Security of Alternative Password Schemes

| | | Security | | | | |
|---|---|---|---|---|---|---|
| Category | Scheme | Resilient to physical observation | Resilient to targeted impersonation | Resilient to throttled guessing | Resilient to unthrottled guessing | Resilient to internal obervation |
| Incumbent | Web Passwords | NC | O | NC | NC | NC |
| Password | Firefox | O/B | O | NC | NC | NC |
| managers | LastPass | O/B | O | O/B | O/B | NC |
| Proxy | URRSA | NC | O | NC | NC | O/B |
| | Imposter | Y/B | O | NC | NC | O/B |
| Federated | OpenID | O/B | O | O/B | O/B | NC |
| | Microsoft Passport | O/B | O | O/B | O/B | NC |
| | Facebook Connect | O/B | O | O/B | O/B | NC |
| | Browser ID | O/B | O | O/B | O/B | NC |
| | OTP over email | O/B | O | O/B | O/B | NC |
| Graphical | PCCP | NC | Y/B | O/B | NC | NC |
| | PassGo | NC | Y/B | NC | NC | NC |
| Cognitive | GrIDSure | NC | NC | NC | NC | NC |
| | Weinshall | O/B | NC | NC | NC | O/B |
| | Hopper Blum | O/B | NC | NC | NC | O/B |
| | Word Association | NC/W | NC | NC | NC | NC |
| Paper tokens | OTPW | NC | Y/B | Y/B | Y/B | Y/B |
| | S/KEY | NC | Y/B | Y/B | Y/B | Y/B |
| | PIN + TAN | NC | Y/B | Y/B | Y/B | Y/B |
| Visual crypto | PassWindow | O/B | Y/B | Y/B | Y/B | O/B |
| Hardware tokens | RSA SecurID | Y/B | Y/B | Y/B | Y/B | Y/B |
| | YubiKey | Y/B | Y/B | Y/B | Y/B | Y/B |
| | IronKey | Y/B | O | NC | NC | O/B |
| | CAP reader | Y/B | Y/B | Y/B | Y/B | Y/B |
| | Pico | Y/B | Y/B | Y/B | Y/B | Y/B |
| Phone based | Phoolproof | Y/B | Y/B | Y/B | Y/B | O/B |
| | Cronto | Y/B | Y/B | Y/B | Y/B | O/B |
| | MP-Auth | NC | O | NC | NC | NC |
| | OTP over SMS | Y/B | Y/B | Y/B | Y/B | O/B |
| | Google 2-Step | O/B | O | Y/B | Y/B | NC |
| Biometric | Fingerprint | Y/B | NC/W | Y/B | NC | NC |
| | Iris | Y/B | NC/W | Y/B | NC | NC |
| | Voice | Y/B | NC/W | O/B | NC | NC |
| Recovery | Personal knowledge | NC | NC/W | NC | NC | NC |
| | Preference-based | NC | O | NC | NC | NC |
| | Social re-auth | O/B | NC/W | Y/B | Y/B | O/B |

TABLE 3-continued

Comparative Evaluation of Security of Alternative Password Schemes

| Category | Scheme | Resilient to Leaks from other verifiers | Resilient to Phishing | Resilient to theft | No trusted third party | Requiring explicit consent |
|---|---|---|---|---|---|---|
| Incumbent | Web Passwords | NC | NC | Y | Y | Y |
| Password | Firefox | NC | Y/B | Y | Y | B |
| managers | LastPass | O/B | Y/B | Y | NC/W | B |
| Proxy | URRSA | NC | Y/B | NC/W | NC | B |
|  | Imposter | NC | Y/B | B | NC | NC/W |
| Federated | OpenID | Y/B | O | Y | NC/W | B |
|  | Microsoft Passport | Y/B | O | Y | NC/W | B |
|  | Facebook Connect | Y/B | O | Y | NC/W | NC/W |
|  | Browser ID | Y/B | O | Y | NC/W | B |
|  | OTP over email | Y/B | Y/B | Y | NC/W | B |
| Graphical | PCCP | Y/B | Y/B | Y | Y | Y |
|  | PassGo | NC | NC | Y | Y | Y |
| Cognitive | GrIDSure | NC | NC | Y | Y | Y |
|  | Weinshall | Y/B | Y/B | Y | Y | Y |
|  | Hopper Blum | Y/B | Y/B | Y | Y | Y |
|  | Word Association | NC | NC | Y | Y | Y |
| Paper | OTPW | Y/B | Y/B | Y | Y | Y |
| tokens | S/KEY | Y/B | O/B | NC/W | Y | Y |
|  | PIN + TAN | Y/B | Y/B | O/W | Y | Y |
| Visual crypto | PassWindow | Y/B | Y/B | Y | Y | Y |
| Hardware | RSA SecurID | Y/B | Y/B | Y | NC/W | Y |
| tokens | YubiKey | Y/B | Y/B | Y | NC/W | Y |
|  | IronKey | NC | Y/B | Y | Y | Y |
|  | CAP reader | Y/B | Y/B | Y | Y | Y |
|  | Pico | Y/B | Y/B | O/W | Y | Y |
| Phone | Phoolproof | Y/B | Y/B | Y | B | Y |
| based | Cronto | Y/B | Y/B | Y | B | Y |
|  | MP-Auth | NC | Y/B | Y | B | Y |
|  | OTP over SMS | Y/B | Y/B | O/W | O/W | Y |
|  | Google 2-Step | Y/B | Y/B | B | B | Y |
| Biometric | Fingerprint | NC | NC | NC/W | Y | Y |
|  | Iris | NC | NC | NC/W | Y | O/W |
|  | Voice | NC | NC | NC/W | Y | Y |
| Recovery | Personal knowledge | NC | NC | Y | Y | Y |
|  | Preference-based | NC | Y/B | Y | Y | Y |
|  | Social re-auth | O/B | Y/B | Y | NC/W | Y |

| Category | Scheme | Security Unlinkable |
|---|---|---|
| Incumbent | Web Passwords | Y |
| Password | Firefox | Y |
| managers | LastPass | Y |
| Proxy | URRSA | Y |
|  | Imposter | Y |
| Federated | OpenID | NC/W |
|  | Microsoft Passport | NC/W |
|  | Facebook Connect | NC/W |
|  | Browser ID | NC/W |
|  | OTP over email | NC/W |
| Graphical | PCCP | Y |
|  | PassGo | Y |
| Cognitive | GrIDSure | Y |
|  | Weinshall | Y |
|  | Hopper Blum | Y |
|  | Word Association | Y |
| Paper | OTPW | Y |
| tokens | S/KEY | Y |
|  | PIN + TAN | Y |
| Visual crypto | PassWindow | Y |

TABLE 3-continued

Comparative Evaluation of Security of Alternative Password Schemes

| | | |
|---|---|---|
| Hardware tokens | RSA SecurID | Y |
| | YubiKey | Y |
| | IronKey | Y |
| | CAP reader | Y |
| | Pico | Y |
| Phone based | Phoolproof | Y |
| | Cronto | Y |
| | MP-Auth | Y |
| | OTP over SMS | Y |
| | Google 2-Step | Y |
| Biometric | Fingerprint | NC/W |
| | Iris | NC/W |
| | Voice | NC/W |
| Recovery | Personal knowledge | Y |
| | Preference-based | Y |
| | Social re-auth | O/W |

Y = Offers the benefit
N = Does not offer the benefit
O = Almost offers the benefit
B = Better than passwords
W = Worse than passwords
NC = No change The Cambridge study groups all attributes into three principal categories which determine how feasible a system is for replacing the password scheme; Usability, Deployability, and Security. These categories are expanded upon below to demonstrate the shortcomings of conventional user authentication methods and systems.

Usability Long memorized secrets or password strings with multiple character types are increasingly difficult for humans to remember and provide a relatively low level of usability in digital security. Reports of digital security breaches in modern password systems are commonplace [7]. Over 40 years of research have demonstrated that the legacy password user authentication scheme is plagued by security problems and openly hated by users, yet it is still relied on by the majority of the user authentication industry [4]. Recent advancements in user authentication technology including modern password managers, biometrics, 2 dimensional interactive password generation and automatic password string generation have attempted to solve the digital security problem, however they have fallen short [8,4]. The National Institute of Standards and Technology (NIST) released new guidelines regarding digital user authentication [1,2,3] to improve the state of the digital security epidemic, namely more stringent requirements on password based memory secrets, however modern authentication systems are still not providing acceptable levels of digital security [4,6]. The most successful improvement to conventional passwords to date has been in the form of password managers[4]. Conventional password managers are being implemented on a wide scale in order to improve the levels of usability, especially those due to human limitations in memorizing multiple long password strings, however conventional password managers still require a user selected memorized secret or password for access into the password manager, rendering the usability of the conventional password manager to be at or below the usability level of a password entry in multiple areas of consideration.

Deployability

Passwords score their highest marks in deployability, which is an attribute linked in large part to the scheme's server side infrastructure potential. Server side infrastructure is almost entirely built for a client side password user authentication system. The guidelines for user authentication by NIST are representative of this server side infrastructure domination, as they are primarily composed of password guidelines [1,2,3]. All forms of user authentication which are not server side password compatible are weak in this category. Research has shown that in order for a user authentication system to replace traditional passwords, password level deployability is a must.

Security

Legacy password systems suffer from low entropy, throttled guessing attacks, unthrottled guessing attacks, internal observation, leaks, phishing and weak encryption infrastructure. The problem is amplified by low password entropy, poor encryption, and single failure security infrastructure. There is no existing technology that solves the password security problem while providing password level usability and security. The alternatives provided in the Cambridge study [4] all present solutions which excel in some areas and lack in others, resulting in very minor scheme changes to the password dominant industry and a continuing security problem. Conventional password managers are being implemented on a wide scale in order to improve the levels of digital security in user authentication, however password managers still require a user selected memorized secret or password for access into the password manager, rendering the security of the conventional password manager to be at or below the usability level of a password entry in multiple areas of consideration.

Therefore, there is a need the art for methods and systems that addresses the above mentioned drawbacks in usability, deployability, and security of conventional memorized character string password based user authentication systems, memorized character string password accessed password managers, and other forms of user authentication, that matches or exceeds password level deployability, usability and security.

Spatial password schemes, which take advantage of a person's significant capability to recognize spatial environments, may resolve the problems associated with textual password schemes.

U.S. Pat. No. 5,559,961 to Blonder, issued Sep. 24, 1996 discloses a graphical password scheme, in which a user is presented with a predetermined graphical image and is required to touch one or more predetermined positions on the image in a predetermined sequence as a memorized secret. This scheme is weak in security in that the memorable tap regions are usually limited and this leads to a limited effective entropy. In addition, the memorability is not as effective as that of a first person interactive spatial environment.

U.S. Pat. No. 5,608,387 to Davies, issued Mar. 4, 1997 presents a graphical password scheme in which a user is required to touch one or more complex human face images as a password. This scheme also suffers from a low level of possible entropy in addition to the usability issue that the memorability is not as effective as that of a first person interactive spatial environment.

U.S. Pat. No. 6,686,931 to Bodnar, issued Feb. 3, 2004 discloses a graphical password methodology for a microprocessor device that accepts non-alphanumeric user input. The graphical password comprises a sequence of non-alphabetic keystrokes. This scheme also suffers from a low level of possible entropy in addition to the usability issue that the memorability is not as effective as that of a first person interactive spatial environment.

U.S. Pat. No. 9,589,125 to Tao, issued Mar. 7, 2017 discloses a graphical password authentication methodology which displays a 3D grid upon a user's request to access a restricted resource. The 3D graphical password authentication method requires the user to enter his or her access password by touching one or more intersections on the 3D grid with an input device. This scheme suffers from a usability issue that the memorability of a grid is not as effective as that of a first person interactive spatial environment.

U.S. Pat. No. 8,458,485 to Bandyopadhyay, et al., issued Jun. 4, 2013 discloses an unlock function that uses an image on a computing device as a template for locking/unlocking a computing device. The user selects portions that are defined within the image in a specified sequence as the lock/unlock code for the computing device. This scheme suffers from a low level of entropy when compared to an interactive, spatial 3D environment. This scheme also suffers from a lack of memorability when compared to an interactive, spatial 3D environment.

SUMMARY

Methods and systems disclosed herein address the above issues, and may provide a number of other benefits as well. Methods and systems disclosed herein provide a unique method and system for generating and entering a digital memorized secret for user authentication by allowing users to navigate a realistic virtual 3D environment with a keyboard, controller, mouse, virtual reality or other form of virtual navigation in order to select an ordered sequence of selectable objects, such as lamps, books, desks, chairs, etc. within the virtual 3D environment as their memorized secret or password in the place of a traditional password. This system solves the above mentioned usability drawbacks of a traditional password system by providing users the ability to use their natural ability to remember realistic spatial environments in place of their limited ability to remember long character strings or grids. This system remains at least as deployable as a traditional password system due to ease of use and its potential use as a password management authentication system, or password entry system, which are readily compatible with server side password infrastructure. This system solves the security issues of a traditional password system by providing higher levels of entropy in memorized secrets, and reducing the amount of human errors involved with memorizing character based password strings.

In one embodiment, the interactive, 3D virtual environment based memorized secret sequence authenticator system is used as the primary user authentication system for a cloud based password manager. The cloud based password manager is an application or tool for the managing, storing, creating, and submitting of passwords for various accounts from any location where internet access is available. An account is defined as an account created by a user on a given website, application, platform, device, or other destination which uses user authentication credentials for entry. The cloud based password management method includes the use of industry standard salting, hashing and encryption of memorized secrets and databases.

In one embodiment, the interactive, 3D virtual environment based memorized secret sequence authenticator system is used as the primary user authentication system for a local machine based password manager. The local machine based password manager is an application or tool for the managing, storing, creating, and submitting of passwords for various accounts. An account is defined as an account created by a user on a given website, application, platform, device, or other destination which uses user authentication credentials for entry. The local machine based password management method includes the use of industry standard salting, hashing and encryption of memorized secrets and databases.

In one embodiment, the interactive, 3D virtual environment based memorized secret sequence authenticator system is used as a high entropy password generator and entry application. The method of high entropy password generator and entry application is used to create high entropy passwords within the interactive, 3D virtual environment based memorized secret sequence authenticator when signing up for user accounts, changing passwords on user accounts, and entering passwords on user accounts. These memorized secrets are transmitted from the application to the destination password fields upon user submission of their object selected based memorized secret sequence.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

FIG. 1 illustrates steps of a method for initial registration of a user on a cloud based password management system in accordance with the embodiments.

FIG. 2 illustrates components of a method for the pre registered user authentication process (200) of the interactive, 3D virtual environment based memorized secret sequence authenticator in accordance with the embodiments.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the inventions is thereby intended. Alterations and further modifications of the inventive features illustrated here, and additional applications of the principals of the inventions as illustrated here, which would occur to one skilled in the relevant art and having possession of this disclosure, are to be considered within the scope of the invention.

Described herein is a digital user authentication method and system for generating and entering a memorized secret based on object selections by a user within an interactive, 3D virtual environment. System and method embodiments of the user authentication system may allow for its use in a cloud based password manager, local device password manager, website, application, mobile device, computer, gaming console and/or other electronic devices. The first time a user accesses the authentication system they will be prompted to register by entering a username and/or other identifying information and then subsequently be prompted to navigate a 3D virtual environment in order to select a sequence of selectable objects within the 3D virtual environment as their memorized secret sequence. On subsequent access attempts, the identified and previously registered user is prompted to select the same sequence of objects, their memorized secret sequence, within the 3D virtual environment saved from previous registration in order to gain access to the desired cloud based password manager, local device password manager, website, application, mobile device, computer, gaming console or other device.

In all implementations, a user can choose the length of their own virtual memorized secret sequence within a pre-determined range. A simplified entropy calculator is provided for the user to compare the estimated entropy from their selected memorized secret sequence length to an average password's entropy.

In one implementation, the 3D virtual environment may spatially scale or warp on each access attempt. Thus, the risk of a simulator attack that automatically navigates the environment and selects objects based on keyboard or mouse loggers would be greatly mitigated.

In one implementation, the 3D virtual environment may change to a different environment. This provides diversity for the user experience as well as for the platform. Thus, the diversity of the platform is increased, and as a result the digital entropy is increased.

In one implementation, the objects within the 3D environment may change, scale in size or change position. Thus, the risk of a simulator attack that automatically navigates the environment and selects objects based on keyboard or mouse loggers would be greatly mitigated.

In one implementation, the character strings associated with each object within the 3D environment may change on some or all user registrations and access attempts.

FIG. 1 shows components of a method for the initial user registration process (100) of the interactive, 3D virtual environment based memorized secret sequence authenticator in accordance with various embodiments. The exemplary embodiment of the virtual 3D based memorized secret entry registration process comprises a user name and information registration (101), 3D virtual interactive object selection sequence module (102), hashing (103), and encrypted data storage (104).

In one embodiment, the present embodiment, the user utilizes the interactive, 3D virtual environment based memorized secret sequence authenticator as the memorized secret (password) for a cloud based password manager. At step (101) of the present embodiment, the user executes the 3D virtual environment based memorized secret sequence generator application on the host computer. The examples of the host computer may include but are not limited to a personal computer, a laptop, a mobile device, a tablet, a gaming console, a personal data assistant, or another electronic device. Thereafter the user sets up the subject account using a username and/or other identifying information. The subject accounts may include but are not limited to a cloud based password manager, local device password manager, website, application, mobile device, computer, gaming console or other device. In other embodiments in step (101), the user utilizes the interactive, 3D virtual environment based memorized secret sequence generator as the memorized secret (password) as user authentication for a local device password manager, website, application, mobile device, computer, gaming console or other device.

Thereafter in step (102), in the present embodiment, the user is prompted to navigate the 3D virtual environment based memorized secret sequence authenticator application in order to select a sequence of selectable objects (MindPass) within the 3D virtual environment as their memorized secret sequence. The examples of the 3D virtual environment based memorized secret sequence authenticator application may include but are not limited to a WEBGL or other graphics library application with additional implementation utilizing Unity3d, Babylon.js, Unreal engine or another 3D virtual environment engine or game development platform. In another implementation, the 3D virtual environment based memorized secret sequence authenticator application is a virtual reality application based utilizing WEBGL or other graphics library application as the sole platform or with additional implementation using Unity3d, Babylon.js, Unreal engine or another 3D virtual environment engine or game development platform. When the user selects the desired amount of objects within the 3D virtual environment based memorized secret sequence authenticator application, the protocol for steps (103) and (104) are initiated. Each object within the 3D virtual environment based memorized secret sequence authenticator application is marked with an associated string of characters, and the total of these character strings from the user selected objects make up a total character string object sequence memorized secret. In step (103) this object sequence memorized secret is hashed utilizing an industry leading hashing protocol and stored in the encrypted (104), using AES or other encryption protocol, password management database. In another implementation of step (103), the users memorized secret sequence is salted prior to hashing utilizing a shape function result based on the polygonal shape created by connecting with lines all objects selected by the user in the memorized secret sequence.

In other embodiments, in steps (101, 102, 103, and 104), the user is prompted to navigate the 3D virtual environment based memorized secret sequence authenticator application in order to select a sequence of selectable objects within the 3D virtual environment as their memorized secret sequence to be used as their password for the respective local device password manager, website, application, mobile device, computer, gaming console or other device. The examples of the 3D virtual environment based memorized secret sequence authenticator application may include but are not limited to a WEBGL or other graphics library application with additional implementation utilizing Unity3d, Babylon.js, Unreal engine or another 3D virtual environment engine or game development platform. In another implementation, the 3D virtual environment based memorized secret sequence authenticator application is a virtual reality application based utilizing WEBGL or other graphics library application as the sole platform or with additional implementation using Unity3d, Babylon.js, Unreal engine or another 3D virtual environment engine or game development platform. When the user selects the desired amount of objects within the 3D virtual environment based memorized secret sequence generator application, the protocol for steps (103) and (104) are initiated. Each object within the 3D virtual environment based memorized secret sequence authenticator application is marked with an associated string of characters, and the total of these character strings from the user selected objects make up a total character string object sequence memorized secret. In step (103) this object sequence memorized secret is hashed utilizing an industry leading hashing protocol and stored in the encrypted (104), using AES or other encryption protocol, password management database. In another implementation of step (103), the users memorized secret sequence is salted prior to hashing utilizing a shape function result based on the polygonal shape created by connecting with lines all objects selected by the user in the memorized secret sequence.

FIG. 2 shows components of a method for the pre registered user authentication process (200) of the interactive, 3D virtual environment based memorized secret sequence authenticator in accordance with various embodiments after the initial registration phase. The exemplary embodiment of the pre registered user authentication process comprises initial access (101), 3D virtual interactive object selection sequence module (102), sequence entry (103), and authentication (104).

In one embodiment, the present embodiment, the user utilizes the interactive, 3D virtual environment based memorized secret sequence authenticator as the memorized secret (password) for a cloud based password manager. At step (201) of the present embodiment, the user executes the 3D virtual environment based memorized secret sequence generator application on the host computer. The examples of the host computer may include but are not limited to a personal computer, a laptop, a mobile device, a tablet, a gaming console, a personal data assistant, or another electronic device. Thereafter the user enters a username.

Thereafter in step (202), in the present embodiment, the user is prompted to navigate the 3D virtual environment based memorized secret sequence authenticator application in order to select their sequence of selectable objects within the 3D virtual environment. The examples of the 3D virtual environment based memorized secret sequence authenticator application may include but are not limited to a WEBGL or other graphics library application with additional implementation utilizing Unity3d, Babylon.js, Unreal engine or another 3D virtual environment engine or game development platform. In another implementation, the 3D virtual environment based memorized secret sequence authenticator application is a virtual reality application based utilizing WEBGL or other graphics library application as the sole platform or with additional implementation using Unity3d, Babylon.js, Unreal engine or another 3D virtual environment engine or game development platform. When the user selects and entered their full sequence of objects within the 3D virtual environment based memorized secret sequence authenticator application, the protocol for steps (203) and (204) are initialized. Each object within the 3D virtual environment based memorized secret sequence authenticator application is marked with an associated string of characters, and the total of these character strings from the user selected objects make up the total character string object sequence memorized secret. In step (203) this object sequence memorized secret, using appropriate salt, hash and encryption protocol, is tested for authentication against the stored memorized secret sequence for that user.

In other embodiments, in steps (201, 202, 203, and 204), a user who has pre registered with a local device password manager, website, application, mobile device, computer, gaming console or other device is prompted to navigate the 3D virtual environment based memorized secret sequence authenticator application in order to select their sequence of selectable objects within the 3D virtual environment. The examples of the 3D virtual environment based memorized secret sequence authenticator application may include but are not limited to a WEBGL or other graphics library application with additional implementation utilizing Unity3d, Babylon.js, Unreal engine or another 3D virtual environment engine or game development platform. In another implementation, the 3D virtual environment based memorized secret sequence authenticator application is a virtual reality application based utilizing WEBGL or other graphics library application as the sole platform or with additional implementation using Unity3d, Babylon.js, Unreal engine or another 3D virtual environment engine or game development platform. When the user selects and entered their full sequence of objects within the 3D virtual environment based memorized secret sequence authenticator application, the protocol for steps (203) and (204) are initialized. Each object within the 3D virtual environment based memorized secret sequence authenticator application is marked with an associated string of characters, and the total of these character strings from the user selected objects make up the total character string object sequence memorized secret. In step (203) this object sequence memorized secret, using appropriate salt, hash and encryption protocol, is tested for authentication against the stored memorized secret sequence for that user.

The foregoing method descriptions, sketches and diagrams are provided merely as illustrative examples and are not intended to require or imply that the steps of the various embodiments must be performed in the order presented. In addition, some of the operations described can be omitted or performed in parallel or concurrently. The above steps and logical blocks have been explained in terms of their functionality. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. The actual software code or specialized control hardware used to implement these systems and methods is not limiting of the invention. This, the operation and behavior of the systems and methods were described without reference to the specific software code being understood that software and control hardware can be designed to implement the systems and methods based on the description herein.

When implemented in software, the functions may be stored as one or more instructions or code on a non-transitory computer readable or processor readable storage medium. The steps of a method or algorithm disclosed herring may be embodied in a processor executable software module, which may reside on a computer readable or processor readable storage medium. A non-transitory computer readable or processor readable media includes both computer storage media and tangible storage media that facilitate transfer of a computer program from one place to another. A non-transitory processor readable storage media may be any available media that may be accessed by a computer. By was of example, and not limitation, such non-transitory processor readable media may comprise any storage medium that may be used to store desired program coe in the form of instructions or data structures and that may be accessed by a computer or processor. In addition, the operations of a method or algorithm may reside as one of any combination or set of codes and/or instructions on a non-transitory processor-readable medium and/or computer readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   establishing a user account responsive to a sequence generator;
   activating an object selection sequence module of said sequence generator, wherein the module generates an interactive three-dimensional (3D) environment populated with a plurality of selectable objects;
   navigating said interactive 3D environment to select a plurality of selectable objects;
   applying a sequence authenticator application to said plurality of selectable objects converting the sequence of selectable objects into a unique password further comprising the steps of associating each selectable object with an associated string of characters or locations, wherein the total of the characters or locations of the sequence of selectable objects comprises a secret memorized password;
   optionally salting said secret memorized password prior to, or after encrypting said secret memorized password;
   storing said secret memorized password;
   access said user's account responsive to said sequence generator;
   activating said object selection sequence module of said sequence generator, wherein the module generates a second interactive 3D environment populated with a plurality of second selectable objects containing the prior selected plurality of selectable objects;
   selecting a second plurality of selectable objects within said second interactive 3D environment;
   applying said sequence authenticator application to said second plurality of selectable objects within said second interactive 3D environment and converting the sequence of said second selectable objects into a unique password, further comprising the steps of associating each second selectable object with an associated string of characters or locations, wherein the total of the characters or locations of the sequence of second selectable objects of second interactive 3D environment comprises a second secret memorized password;
   optionally salting said second secret memorized password prior to, or after encrypting said second secret memorized password; and
   comparing said second secret memorized password with said stored secret memorized password, wherein said user is authenticated when said second secret memorized password matches said stored secret memorized password.

2. The method of claim 1, wherein said step of encrypting comprises the step of hashing said secret memorized password.

3. The method of claim 1, wherein the step of authentication further generates a signal to said sequence generator to allow said user access to a device, website, application, console, or password manager.

4. The method of claim 1, and further comprising the step of establishing a spatial coordinate interactive 3D environment, wherein each of said selectable objects is associated with a position within said spatial coordinate.

5. The method of claim 4, wherein said step of salting comprises the step of automatically generating a two-dimensional (2-D) or 3D shape formed by connecting the spatial coordinates of said selectable objects within said second interactive 3D environment forming a shape function result that can be associated with said secret memorized password.

6. The method of claim 5, wherein said shape function result is associated with an encryptable and/or saltable identifier.

7. The method of claim 6, wherein said identifier comprises a string of characters or spatial coordinates that corresponds to said shape function result.

8. The method of claim 1, and further comprising the step of spatially distorting said second interactive 3D environment prior to activating said object selection sequence module of said sequence generator in response to an attempt to generate a new interactive 3D environment.

9. A method comprising:
   establishing a user account responsive to a sequence generator;
   activating an object selection sequence module of said sequence generator, wherein the module generates an interactive three-dimensional (3D) environment populated with a plurality of selectable objects;
   navigating said interactive 3D environment to select a plurality of selectable objects, wherein each of said selectable objects is associated with a position within a spatial coordinate;
   automatically generating a two-dimensional (2-D) or 3D shape formed by connecting the spatial coordinates of said selectable objects within said interactive 3D environment forming a shape function result;
   associating an encryptable and/or saltable identifier with said shape function result;
   applying a sequence authenticator application to said plurality of selectable objects converting the sequence of selectable objects into a unique password further comprising the steps of associating each selectable object with an associated string of characters or locations, wherein the total of the characters or locations of the sequence of selectable objects, and said shape function result comprises a secret memorized password;
optionally salting said secret memorized password prior to, or after encrypting said secret memorized password;
storing said secret memorized password;
access said user's account responsive to said sequence generator;
activating said object selection sequence module of said sequence generator, wherein the module generates a second interactive 3D environment populated with a plurality of second selectable objects containing the prior selected plurality of selectable objects;
navigating said second interactive 3D environment to select a second plurality of selectable objects, wherein each of said selectable objects is associated with a position within a spatial coordinate;
automatically generating a second two-dimensional (2-D) or 3D shape formed by connecting the spatial coordinates of said selectable objects within said second interactive 3D environment forming a second shape function result;
associating an encryptable and/or saltable identifier with said second shape function result;
applying said sequence authenticator application to said plurality of second selectable objects within said second interactive 3D environment and converting the sequence of said second selectable objects into a unique password, further comprising the steps of associating each second selectable object with an associated string of characters or locations, wherein the total of the characters or locations of the sequence of second selectable objects, and said second shape function result comprises a second secret memorized password;
optionally salting said second secret memorized password prior to, or after encrypting said second secret memorized password; and
comparing said second secret memorized password with said stored secret memorized password, wherein said user is authenticated when said second secret memorized password matches said stored secret memorized password.

10. The method of claim 9, wherein said step of encrypting comprises the step of hashing said secret memorized password.

11. The method of claim 9, wherein the step of authentication further generates a signal to said sequence generator to allow said user access to a device, website, application, console, or password manager.

12. The method of claim 9, wherein the identifier comprises a string of characters or spatial coordinates that corresponds to said shape function result.

13. The method of claim 9, and further comprising the step of spatially distorting said second interactive 3D environment prior to activating said object selection sequence module of said sequence generator in response to an attempt to generate a new interactive 3D environment.

14. A method comprising:
establishing a user account responsive to a sequence generator;
activating an object selection sequence module of said sequence generator, wherein the module generates an interactive three-dimensional (3D) environment populated with a plurality of selectable objects;
navigating said interactive 3D environment to select a plurality of selectable objects;
applying a sequence authenticator application to said plurality of selectable objects converting the sequence of selectable objects into a unique password further comprising the steps of associating each selectable object with an associated string of characters or locations, wherein the total of the characters or locations of the sequence of selectable objects comprises a secret memorized password;
salting said secret memorized password prior to, or after encrypting said secret memorized password;
storing said secret memorized password;
access said user's account responsive to said sequence generator;
activating said object selection sequence module of said sequence generator, wherein the module generates a second interactive 3D environment populated with a plurality of second selectable objects containing the prior selected plurality of selectable objects;
selecting a second plurality of selectable objects within said second interactive 3D environment;
applying said sequence authenticator application to said plurality of second selectable objects within said second interactive 3D environment and converting the sequence of said second selectable objects into a unique password, further comprising the steps of associating each second selectable object with an associated string of characters or locations, wherein the total of the characters or locations of the sequence of second selectable objects of second interactive 3D environment comprises a second secret memorized password;
optionally salting said second secret memorized password prior to, or after encrypting said second secret memorized password;
comparing said second secret memorized password with said stored secret memorized password, wherein said user is authenticated when said second secret memorized password matches said stored secret memorized password; and
spatially distorting said second interactive 3D environment prior to activating said object selection sequence module of said sequence generator in response to an attempt to generate a new interactive 3D environment.

15. The method of claim 14, wherein said step of encrypting comprises the step of hashing said secret memorized password.

16. The method of claim 14, wherein the step of authentication further generates a signal to said sequence generator to allow said user access to a device, website, application, console, or password manager.

17. The method of claim 14, and further comprising the step of establishing a spatial coordinate interactive 3D environment, wherein each of said selectable objects is associated with a position within said spatial coordinate.

18. The method of claim 17, wherein said step of salting comprises the step of automatically generating a two-dimensional (2-D) or 3D shape formed by connecting the spatial coordinates of said selectable objects within said second interactive 3D environment forming a shape function result that can be associated with said secret memorized password.

19. The method of claim 18, wherein said shape function result is associated with an encryptable and/or saltable identifier.

20. The method of claim 19, wherein said identifier comprises a string of characters or spatial coordinates that corresponds to said shape function result.

* * * * *